(12) United States Patent
Miura

(10) Patent No.: US 7,576,789 B2
(45) Date of Patent: Aug. 18, 2009

(54) MULTI-FUNCTION INPUT SWITCH AND PHOTOGRAPHING APPARATUS THEREWITH

(75) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 11/376,365

(22) Filed: Mar. 15, 2006

(65) Prior Publication Data
US 2006/0227235 A1 Oct. 12, 2006

(30) Foreign Application Priority Data
Apr. 8, 2005 (JP) ............... 2005-112615
Jan. 27, 2006 (JP) ............... 2006-019170

(51) Int. Cl.
*H04N 5/222* (2006.01)
*H04N 5/225* (2006.01)
(52) U.S. Cl. .................. 348/333.01; 348/373
(58) Field of Classification Search ............ 348/333.01, 348/333, 373
See application file for complete search history.

(56) References Cited

U.S. PATENT DOCUMENTS 6,069,648 A * 5/2000 Suso et al. ............... 348/14.02
7,283,854 B2 * 10/2007 Sato et al. ................ 455/575.3
7,353,049 B2 * 4/2008 Mizuta ..................... 455/575.3

FOREIGN PATENT DOCUMENTS

JP 2001-142622 A 5/2001
JP 2001142622 A * 5/2001

OTHER PUBLICATIONS

The above references were cited in a Feb. 15, 2008 Chinese Office Action issued in the counterpart Chinese Patent Application 200610073299.9, which is enclosed with translation.

* cited by examiner

*Primary Examiner*—Lin Ye
*Assistant Examiner*—Marly Camargo
(74) *Attorney, Agent, or Firm*—Cowan, Liebowitz & Latman, P.C.

(57) ABSTRACT

A multi-function input switch comprises a rotary dial, and a joint portion connected to a side edge portion of a body frame including a display panel, wherein the rotary dial is arranged so that each of a circumferential surface portion and a circular plane portion is exposed from the body frame.

10 Claims, 14 Drawing Sheets

FIG. 13

| OPERATION MODE | CORRESPONDING FIGURE | PANEL OPEN/CLOSE | ORIENTATION OF PANEL DISPLAY SURFACE | ON/OFF OF EVF DISPLAY | ROTATIONAL DIRECTION OF DIAL OPERATION | OPERATION SURFACE OF DIAL OPERATION | FOUR-WAY OPERATIVE BUTTON OPERATION | ASSIGNMENT OF PERIPHERAL BUTTON OPERATION | OPERATION SURFACE OF PERIPHERAL BUTTON OPERATION |
|---|---|---|---|---|---|---|---|---|---|
| REC | FIG. 9 | OPEN | FACING TO PHOTOGRAPHER | OFF | NORMAL | SIDE · FRONT | NORMAL | NORMAL | SIDE · FRONT |
| | FIG. 9 | OPEN | FACING TO PHOTOGRAPHER | ON | NORMAL | SIDE · FRONT | NORMAL | NORMAL | SIDE · FRONT |
| | FIG. 10 | OPEN | FACING TO PHOTOGRAPH OBJECT | ON | REVERSE | SIDE (· FRONT) | FORBIDDEN (/INVERSE IN EACH OF VERTICAL AND HORIZONTAL DIRECTIONS) | INVERSE IN VERTICAL DIRECTION | SIDE (· FRONT) |
| | FIG. 11 | CLOSE | FACING TO BODY FRAME (CLOSE) | ON | NORMAL | SIDE | DON'T CARE (UNUSED) | NORMAL | SIDE |
| | FIG. 12 | CLOSE | OUTSIDE (OPEN) | ON | REVERSE | SIDE · FRONT | INVERSE IN EACH OF VERTICAL AND HORIZONTAL DIRECTIONS, FORBIDDEN/OPTIONAL ASSIGN | INVERSE IN VERTICAL DIRECTION | SIDE · FRONT |
| PB | FIG. 9 | OPEN | FACING TO PHOTOGRAPHER | OFF | NORMAL | SIDE · FRONT | NORMAL | NORMAL | SIDE · FRONT |
| | FIG. 9 | OPEN | FACING TO PHOTOGRAPHER | ON | NORMAL | SIDE · FRONT | NORMAL | NORMAL | SIDE · FRONT |
| | FIG. 10 | OPEN | FACING TO PHOTOGRAPH OBJECT | ON | REVERSE | SIDE (· FRONT) | FORBIDDEN (/INVERSE IN EACH OF VERTICAL AND HORIZONTAL DIRECTIONS) | INVERSE IN VERTICAL DIRECTION | SIDE (· FRONT) |
| | FIG. 11 | CLOSE | FACING TO BODY FRAME (CLOSE) | ON | NORMAL | SIDE | DON'T CARE (UNUSED) | NORMAL | SIDE |
| | FIG. 12 | CLOSE | OUTSIDE (OPEN) | OFF/ON | REVERSE | SIDE · FRONT | INVERSE IN EACH OF VERTICAL AND HORIZONTAL DIRECTIONS | INVERSE IN VERTICAL DIRECTION | SIDE · FRONT |

MULTI-FUNCTION INPUT SWITCH AND PHOTOGRAPHING APPARATUS THEREWITH

BACKGROUND OF THE INVENTION

1. Field of the Invention

The present invention relates to a multi-function input switch provided with a rotary dial.

2. Related Background Art

There has been known a multi-function input switch such as a rotary encoder with a push switch mechanism (see Japanese Patent Application Laid-open No. 2001-052389). An operator uses the switch to select a character or a mode by rotating a rotary dial having a rotary encoding function and to determine the selected content by pressing the rotary dial from the peripheral portion thereof toward a direction perpendicular to a rotation axis. Multi-function input switches having determination mechanisms different from that described above include a mechanism in which the switch is depressed for determination by inclining a circular plane portion about an axis perpendicular to the rotation axis.

In addition, there are switches where the rotary dial and the determination switch are separately provided, and switches where the rotary dial does not rotate by 360 degrees but rotate in a limited angular range for selection.

In terms of the forms of multi-function input switches, there are multi-function input switches where a four-way operational switch, an eight-way operational switch, or the like is used, instead of the rotary dial, to select an item and to determine the selected item with a determination switch positioned at the center thereof.

However, the conventional multi-function input switches with a rotary dial have problems that a rotation operation can be performed toward only single direction, and each of a selection and determination operations independent of the rotation operation must be a single input.

SUMMARY OF THE INVENTION

The present invention has been made to solve the above problems, and an object thereof is to provide a multi-function input switch having good input and selection operability, and a photographing apparatus provided with the multi-function input switch.

To achieve the foregoing object, the present invention includes a configuration described below.

According to an aspect of the invention, a multi-function input switch comprises: a rotary dial; and a joint portion connected to a side edge portion of a body frame including a display panel, in which the rotary dial is arranged so that each of a circumferential surface portion and a circular plane portion is exposed from the body frame.

BRIEF DESCRIPTION OF THE DRAWINGS

FIG. 13 is a diagram showing in detail operation modes of the digital video camera of FIG. 9, to which control contents of the multi-function input switch and selection buttons are related;

DESCRIPTION OF THE PREFERRED EMBODIMENT

Hereinafter, an embodiment of the present invention will be described with reference to the accompanying drawings.

Figure 1:
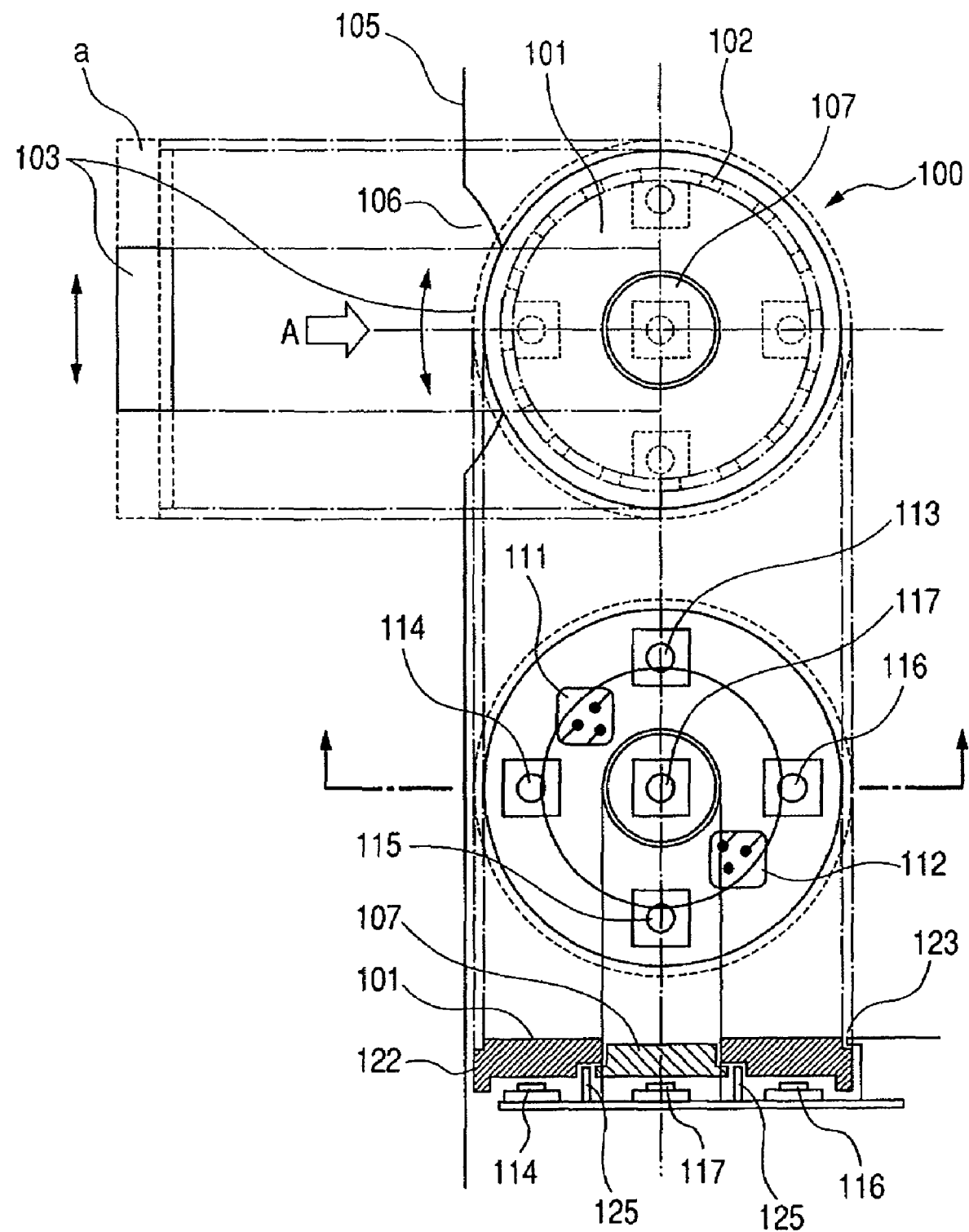
FIG. 1 is a diagram schematically showing a configuration of a multi-function input switch according to an embodiment of the present invention.

FIG. 1 is a diagram schematically showing a configuration of a multi-function input switch according to the embodiment of the present invention.

In FIG. 1, a multi-function input switch 100 is constituted by a ring-shaped-disc-like rotary dial 101 accommodated in an accommodation portion positioned at a side edge of a body frame 105. In the rotary dial 101, a ring-shaped plane is entirely exposed, and a part of a circumferential surface 103 indicated by the arrow A is exposed at a notch 106 of the body frame 105. A portion indicated by "a" of FIG. 1, of the circumferential surface 103 of the rotary dial 101 is placed behind the body frame 105, and thus cannot be seen from the direction of the arrow A.

The multi-function input switch 100 has a center switch 107 provided at the center of the rotary dial 101, tactile switches 113 to 116 provided below the rotary dial 101 at 90-degree intervals, and a tactile switch 117 provided below the center switch 107. Each of the tactile switches 113 to 116 is of a non-lock type in which the switch is not locked even when depressed and returns to an initial position when released, and is closed when depressed with a finger at an upper surface of the rotary dial 101 and opened when the finger is released therefrom.

The body frame 105 has a cover portion 123 around the rotary dial 101. A clearance is provided between the cover portion 123 and the rotary dial 101, the clearance being required and sufficient to rotate the rotary dial 101 and press the tactile switches 113 to 116.

The body frame 105 has a circular rib 125 provided at the center of a bottom surface of the accommodation portion of the rotary dial 101 so as to accommodate the center switch 107 and the tactile switch 117. A clearance which is required and sufficient to slide the center switch 107 is provided between the rib 125 and the center switch 107. The rib 125 may be formed of an elastic member such as rubber. In such a case, when one side of the rotary dial 101 is depressed to close one of the tactile switches 113 to 116, smooth feeling of an operation can be realized.

A concave portion 102 is arranged on the periphery of the upper surface of the rotary dial 101 to avoid slipping. With this structure, the rotary dial 101 can be operated with a finger on the upper surface thereof without slipping. The concave portion 102 can be replaced with a convex portion. In addition, the circumferential surface 103 of the rotary dial 101 has a milled surface to avoid slipping, and therefore, the circumferential surface 103 of the rotary dial 101 can be operated with a finger thereon without slipping.

The multi-function input switch 100 also has electrical contacts 111 and 112 for rotary encoding, each having the same spring characteristic and provided diagonally below the rotary dial 101. The rotary dial 101 has, at a peripheral portion of a rear surface thereof, a disc-like metal plate having uneven patterns arranged correspondingly to the electrical contacts 111 and 112 and the tactile switches 113 to 116. The metal plate and the electrical contacts 111 and 112 constitute a rotary encoder.

Since the electrical contacts having the same spring characteristic are provided diagonally below the rotary dial 101, inclination of the rotary dial 101 is prevented and a contact having better contact property can be used when needed. Such a structure providing a pair of the electrical contacts 111 and 112 is not always required.

With the multi-function input switch 100 of FIG. 1, an operator performs a selection operation by rotating the rotary dial 101, which constitutes the rotary encoder, or by pressing the corresponding peripheral portion of the rotary dial 101 to open and close each tactile switches 113 to 116. Then, the operator can perform a determination operation by pressing the center switch 107. Therefore, a multi-function input switch having good input and selection operability can be provided.

In this embodiment, four switches, the tactile switches 113 to 116, are used to implement a "four-way operative input function". However, other than four switches, eight tactile switches may be provided to implement an "eight-way operative input function", for example. Further, the switches are not limited to tactile switches, and other switches may be used.

Figure 2:
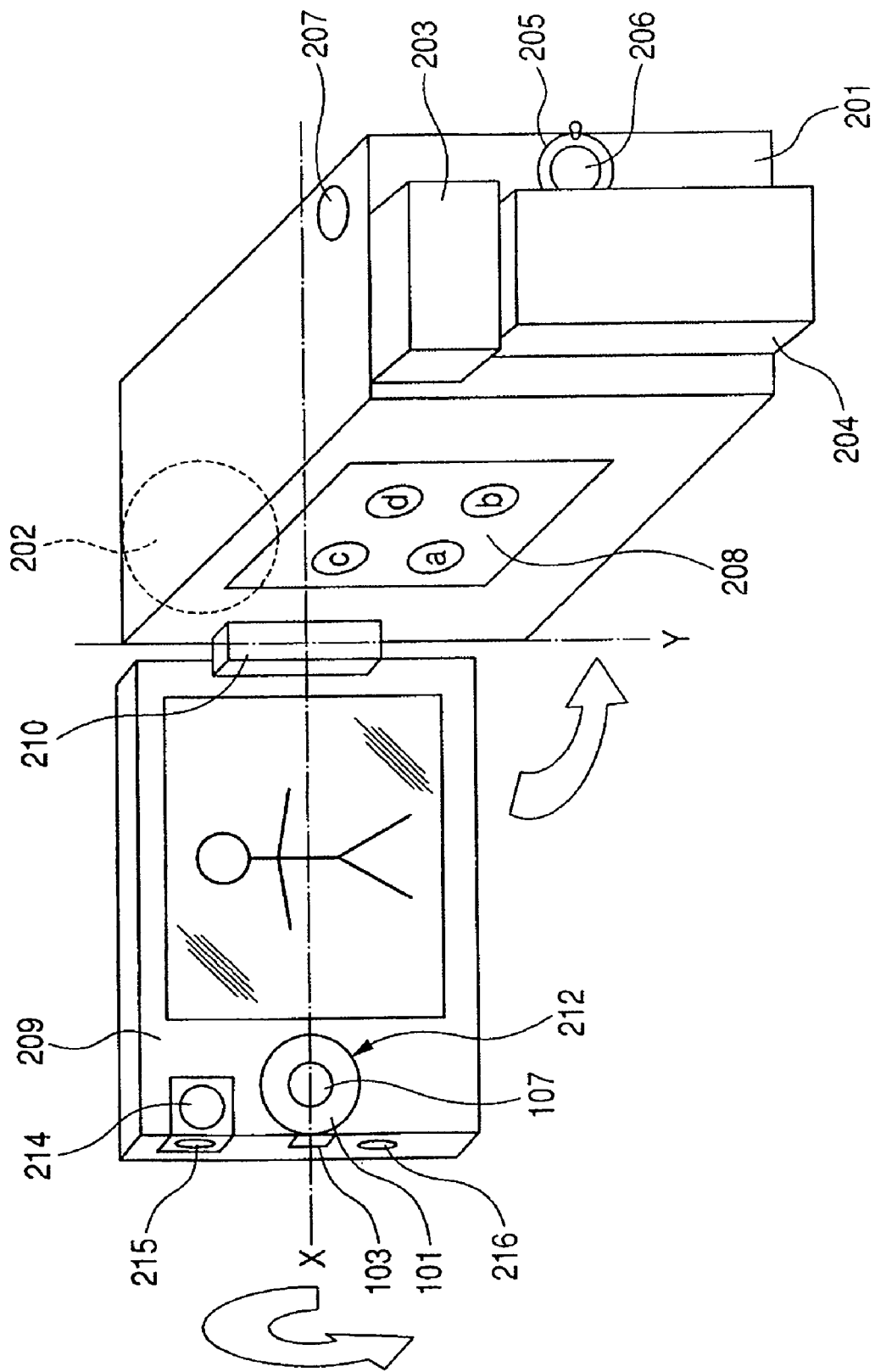
FIG. 2 is a perspective view schematically showing an appearance of a digital video camera having the multi-function input switch of FIG. 1 in a state where a liquid crystal display panel unit is opened.

FIG. 2 is a perspective view schematically showing an appearance of a digital video camera having the multi-function input switch of FIG. 1 in a state where a liquid crystal display panel unit is opened.

The digital video camera of FIG. 2 includes a main body 201 and a liquid crystal display panel unit 209 (body frame) attached to a front edge at a side of the main body 201 (a lens side) via a hinge 210 so as to freely rotate about both an X axis (lateral axis) and a Y axis (vertical axis).

The main body 201 includes a charged coupled device (CCD) and a tape recording/reproducing unit (not shown) which detachably accommodates cassette tape used for recording and reproducing. In addition, the main body 201 includes a lens optical system 202 on a front surface thereof, and an electrical view finder (EVF) 203, a detachable battery 204, a mode dial 205, and a start/stop button 206 on a rear surface thereof. The main body 201 further includes a shutter button 207 on a top surface thereof and function switches 208 on a side surface thereof.

The liquid crystal display panel unit 209 has, on a rear surface thereof, a display surface, a multi-function input switch 212, and a selection button 214. The multi-function input switch 212 is the same as that described with reference to FIG. 1, and provided with the rotary dial 101 and the center switch 107. The rotary dial 101 has the circumferential surface 103.

The liquid crystal display panel unit 209 includes, at a side edge portion thereof, selection buttons 215 and 216.

The lens optical system 202 forms an image of a subject on the CCD provided in the main body 201. The EVF 203 displays the same image content as that to be displayed on the liquid crystal display panel unit 209 when the liquid crystal display panel unit 209 is not used. The battery 204 is a lithium ion battery for supplying the power to the digital video camera.

The mode dial 205 switches, through its rotation, operation modes of the digital video camera, such as OFF, a camera mode, and a tape reproduction mode. The start/stop button 206 operates in a toggle manner as follows. After the camera mode is set by rotating the mode dial 205, when the start/stop button 206 is depressed once, photographing starts; when depressed again, the photographing is set to be standby; and when further depressed again, the photographing starts again. Further, it can also be set such that photographing and recording is performed only when the start/stop button 206 is being depressed. The shutter button 207 is used to record a still image by being depressed in a photographing standby state. In general, photographed still images are recorded on tape, a memory card, (which are not shown) or the like. The function switches 208 are used to set various modes, and serves as a reproduction button and the like in the tape reproduction mode. The function switches 208 may be omitted if the functions thereof are provided for the multi-function input switch 212.

The liquid crystal display panel unit 209 displays images input by the lens optical system 202, and images reproduced by a tape recording/reproducing unit (not shown), and displays information for control effected by the function switches 208, the multi-function input switch 212, or the like.

The hinge 210 mounts the liquid crystal display panel unit 209 to the main body 201 such that the liquid crystal display panel unit 209 can freely rotate about both the X axis and the Y axis. Therefore, for example, when photographing is performed with the main body 201 being lifted up to a higher position, the display surface of the liquid crystal display panel unit 209 can be faced downward, and when photographing is performed with the main body 201 being held in a lower position, the display surface of the liquid crystal display panel unit 209 can be faced upward. With this structure, the liquid crystal display panel unit 209 can be adjusted to an angle at which the photographer can easily see the display surface. In this case, even when the liquid crystal display panel unit 209 is rotated, electric wiring (not shown) connecting an internal portion of the main body 201 to the liquid crystal display panel unit 209 is arranged so as to be prevented from being entangled or drawn.

With the multi-function input switch 212, the operator performs a selection operation by rotating the rotary dial 101, which constitutes the rotary encoder, or by pressing the corresponding peripheral portion of the rotary dial 101 to close and open each tactile switches 113 to 116. Then, the operator can perform a determination operation by pressing the center switch 107.

The selection operation with the multi-function input switch 212 may be combined with an operation of each selection buttons 214 to 216.

Figure 3:
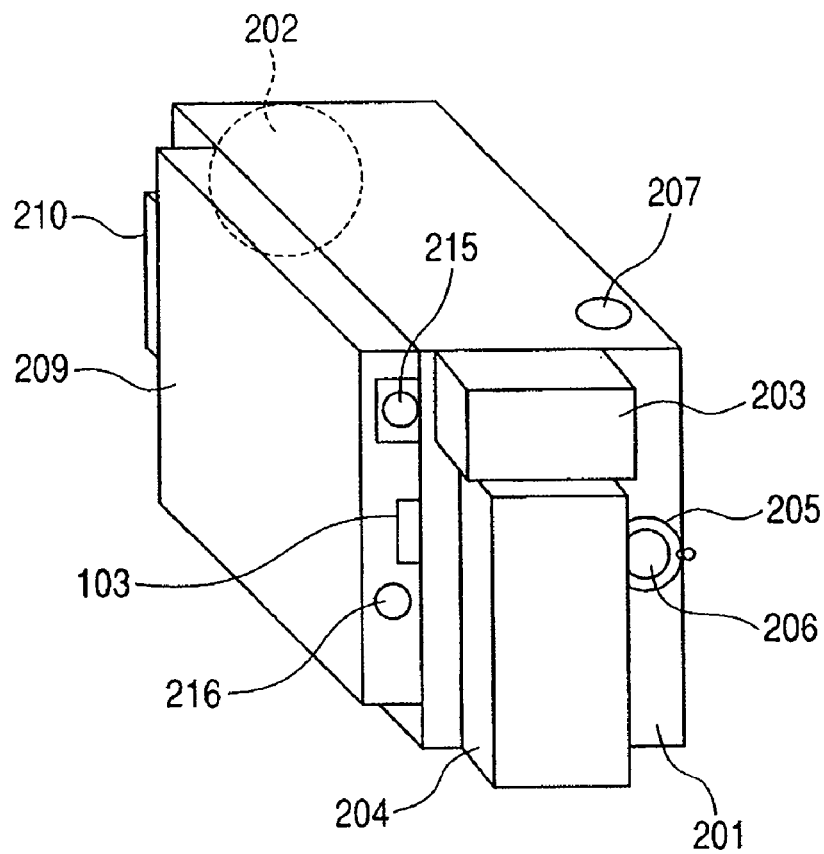
FIG. 3 is a perspective view schematically showing an appearance of the digital video camera of FIG. 2 in a state where the liquid crystal display panel unit is closed.

FIG. 3 is a perspective view schematically showing an appearance of the digital video camera of FIG. 2 in a state where the liquid crystal display panel unit 209 is closed.

In FIG. 3, the display surface of the liquid crystal display panel unit 209, the ring-shaped plane of the rotary dial 101, the center switch 107, the selection button 214, and the like are hidden. They cannot be operated in this state except the rotary dial 101. The rotary dial 101 can be operated through the rotation of the circumferential surface 103 because the circumferential surface 103 thereof is exposed.

Figure 4:
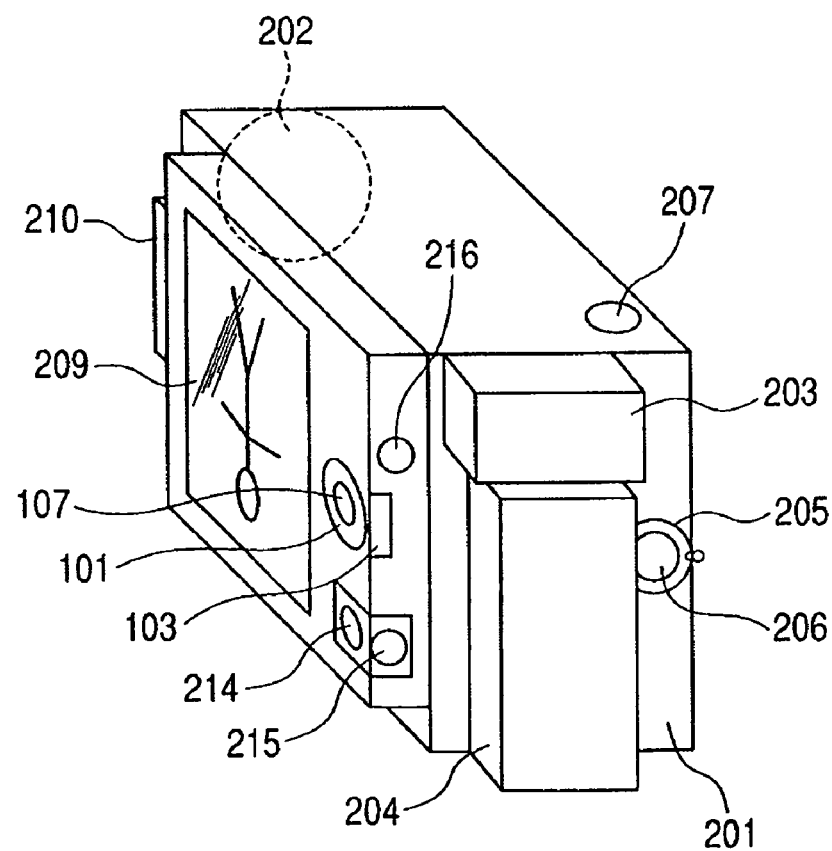
FIG. 4 is a perspective view schematically showing an appearance of the digital video camera of FIG. 2 in a state where the liquid crystal display panel unit is inverted.

FIG. 4 is a perspective view schematically showing an appearance of the digital video camera of FIG. 2 in a state where the liquid crystal display panel unit 209 is inverted.

The state of FIG. 4 is obtained when the liquid crystal display panel unit 209 is rotated about the X axis so as to be inverted at the state of FIG. 2, and rotated about the Y axis to be closed. As a result, the display surface of the liquid crystal display panel unit 209 can be seen, and the display surface, the rotary dial 101, and the like are turned upside down.

According to this embodiment, since the multi-function input switch 212 and the display surface of the liquid crystal display panel unit 209 are provided on the same plane as shown in FIG. 2, the operator can easily and intuitively understand the correspondence between the display content and the multi-function input switch 212. Further, as shown in FIG. 3, even when the liquid crystal display panel unit 209 is closed and a part of the multi-function input switch 212 is hidden, the multi-function input switch 212 can be operated through the circumferential surface 103. Accordingly, the operator can operate the rotary dial 101 of the multi-function input switch 212 while viewing the EVF 203.

Figure 5:
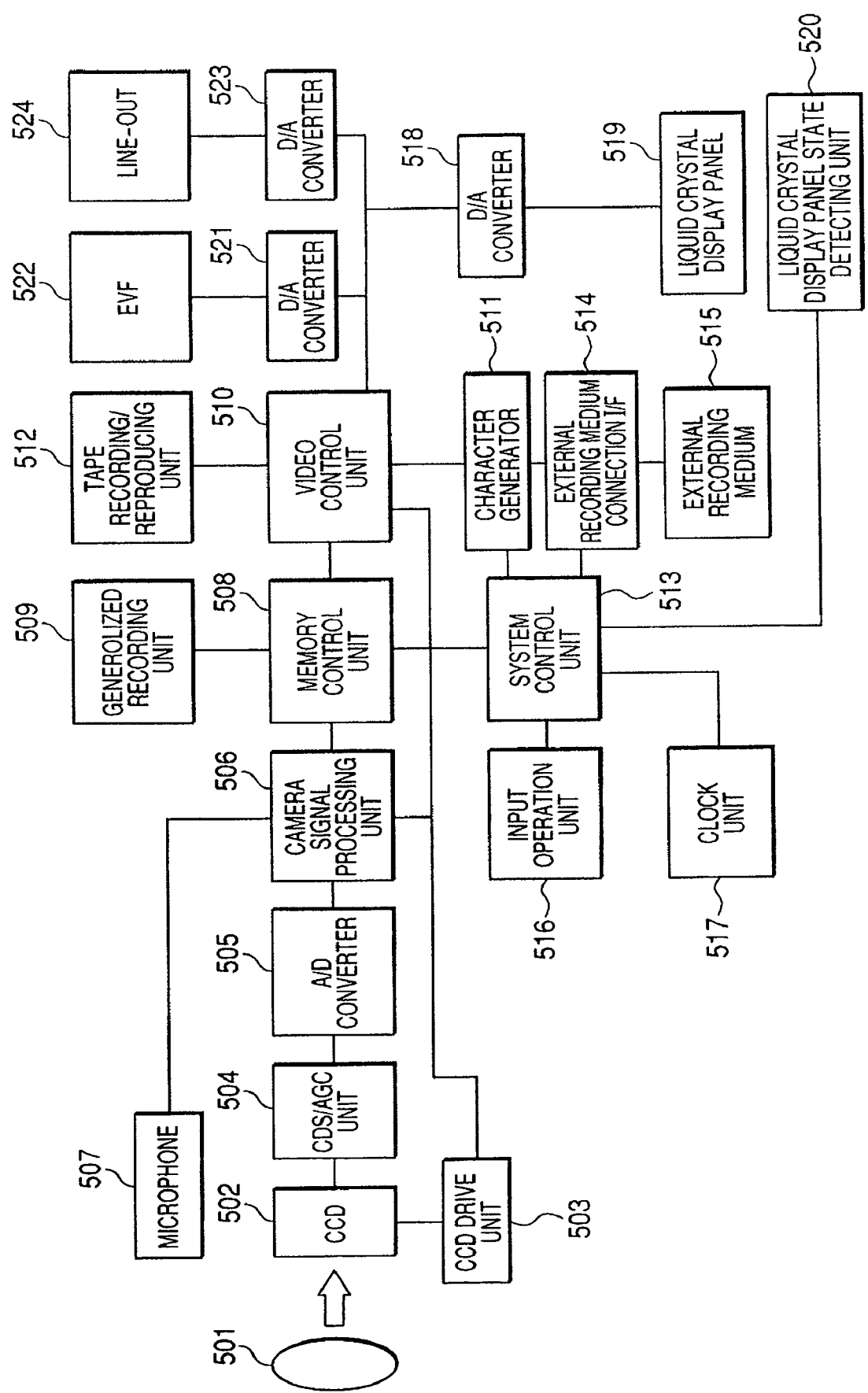
FIG. 5 is a block diagram schematically showing an internal configuration of the digital video camera of FIG. 2.

FIG. 5 is a block diagram schematically showing an internal configuration of the digital video camera of FIG. 2.

In FIG. 5, a lens 501 of the digital video camera is a lens which has a zoom function and is used for capturing an image of an object (not shown). A charged coupled device (CCD) 502 is an image capture element for capturing an image input by an optical system constituted by the lens 501. A CCD drive unit 503 drives the CCD 502 according to a timing signal sent from a camera signal processing unit 506.

A correlated double sampling (CDS)/auto gain controller (AGC) unit 504 samples an analog signal sent from the CCD 502. The CDS/AGC unit 504 also performs gain control of the signal level under the control of a system control unit 513.

An analog/digital (A/D) converter 505 converts an analog signal sent from the previous stage into a digital signal. The camera signal processing unit 506 is in charge of timing generation and control of a camera unit, such as auto exposure (AE) control and auto focus (AF) control, in cooperation with the system control unit 513. A microphone 507 collects sound to record ambient sound while images input through the camera unit are recorded. A memory control unit 508 controls a generalized storage unit 509, and applies a special effect (such as fade-in/out, wipe, scroll, mosaic, black and white, or sepia processing) to an image signal sent from the camera signal processing unit 506 by utilizing processing performed in the generalized storage unit 509. The generalized storage unit 509 is a ROM or a RAM which stores a program and data that are used to realize various control means, and which is also used as a work area for control execution as needed. A video control unit 510 controls a tape recording/reproducing unit 512. The video control unit 510 also superimposes a text title generated by a character generator 511 or image information recorded in an external recording medium 515 on a digital image signal input from the camera unit in cooperation with the system control unit 513.

The character generator 511 accesses a read only memory (ROM) which stores the bit patterns of characters and symbols to be displayed, and reads from the ROM the time code of date and time, a symbol character, and the like on the basis of the date and time read from a clock unit 517 via a control CPU. Then, in the video control unit 510, the read items are superimposed on a video signal in accordance with the horizontal and vertical synchronizing signals of the image (screen), and the tape recording/reproducing unit 512 records the obtained image. In the drawing, the ROM is included in the character generator 511 and therefore not shown. Instead of the character generator 511, it is also possible that the generalized storage unit 509 holds the data of bit map OSD, and the video control unit 510 reads the bit map data therefrom and superimposes it on an image.

The tape recording/reproducing unit 512 records in or reproduces from DV tape an image signal which has been encoded in the SD format of the DV standard by the video control unit 510.

The system control unit 513 executes control processing shown in FIG. 6, which will be described later.

In this embodiment, an external recording medium connection interface 514 is a memory card slot, and the external recording medium 515 is a memory card. In the memory card, any still images are recorded in advance.

An input operation unit 516 includes the multi-function input switch of FIG. 1, other independent selection button and determination button, and various mode buttons. The clock unit 517 has a real time clock (RTC) and a backup battery, counts the date and time, and returns date and time information in response to a request sent from the system control unit 513.

A D/A converter 518 receives a digital image signal sent from the camera unit or digital image information recorded in tape through the video control unit 510, converts it into an analog signal, and sends the analog signal to a liquid crystal display panel 519. The liquid crystal display panel 519 displays the image signal sent from the camera unit, an image signal reproduced from the tape, any image information recorded in the external recording medium 515, on-screen-display (OSD) information sent from the character generator 511, based on information of an input operation performed by a user at the input operation unit 516, and the like.

A liquid crystal display panel state detecting unit 520 detects the open/close state and the rotation state of the liquid crystal display panel 519 by using a Hall element, a physical switch, or the like. A D/A converter 521 is the same as the D/A converter 518. An EVF 522 performs a display operation in the same way as the liquid crystal display panel 519. A D/A converter 523 is the same as the D/A converter 518. A line-out 524 connects to an external television monitor or the like with a composite cable or an S cable to allow the external television monitor or the like to perform a display operation in the same way as the liquid crystal display panel 519.

Figure 6:
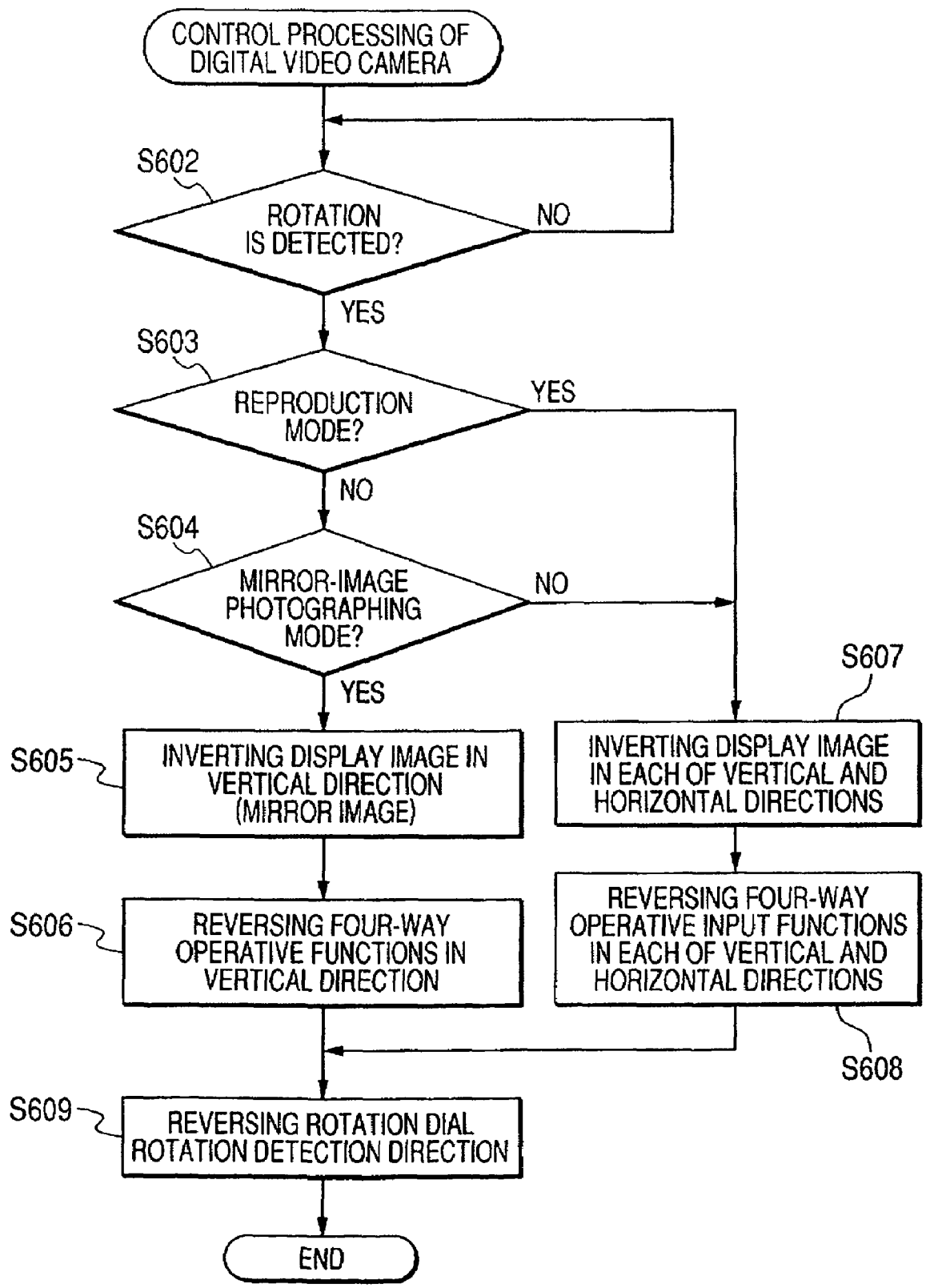
FIG. 6 is a flowchart showing a procedure of control processing performed by the digital video camera of FIG. 2.

FIG. 6 is a flowchart showing a procedure of control processing performed by the digital video camera of FIG. 2.

It is assumed that the digital video camera is set in a state where the liquid crystal display panel unit 209 is rotated about the X axis so as to be inverted from the state of FIG. 2.

In FIG. 6, the digital video camera is in a standby state at first. In this state, the Hall element or the physical switch (neither is shown) for detecting a magnetic variation is used to detect the positional relationship between the main body 201 and the liquid crystal display panel unit 209, and the rotation of the liquid crystal display panel unit 209 about the X axis and the Y axis (Step S602). Here, the 180-degree rotation (inversion) of the liquid crystal display panel unit 209 about the X axis is detected (Yes in Step S602). If the rotation is detected, it is determined whether the digital video camera is in a reproduction mode (Step S603). If the digital video camera is not in a reproduction mode but in a photographing mode, it is then determined whether the photographing mode is a mirror-image photographing mode (Step S604).

If it is determined in Step S603 that the digital video camera is in the reproduction mode or if it is determined in Step S604 that the photographing mode is not the mirror-image photographing mode, the processing proceeds to Step S607. In Step S607, the display image is vertically and horizontally inverted so as to be displayed as in a regular display screen since the liquid crystal display panel unit 209 has been inverted about the X axis (Step S607). Next, according to the vertical and horizontal inversion of the display image, the directions specified by the "four-way operative input function" are each reversed vertically and horizontally (Step S608). Further, according to the inversion of the liquid crystal display panel unit 209 about the X axis and at least the vertical inversion of the display image, the rotation detection direction of the rotary dial 101 is inverted to invert the operation direction of the rotary dial 101 (Step S609). Then, the processing ends.

If it is determined in Step S604 that the photographing mode is the mirror-image photographing mode, the display image is inverted only vertically to be displayed as a mirror image in accordance with the inversion of the liquid crystal display panel unit 209 about the X axis (Step S605). Similarly, the vertical directions specified by the "four-way operative input function" are vertically reversed in accordance with the mirror-image display (Step S606). Further, according to the inversion of the liquid crystal display panel unit 209 about the X axis and the mirror-image display applied to the display image, the rotation detection direction of the rotary dial 101 is inverted to invert the operation direction of the rotary dial 101 (Step S609). Then, the processing ends.

Figure 7:
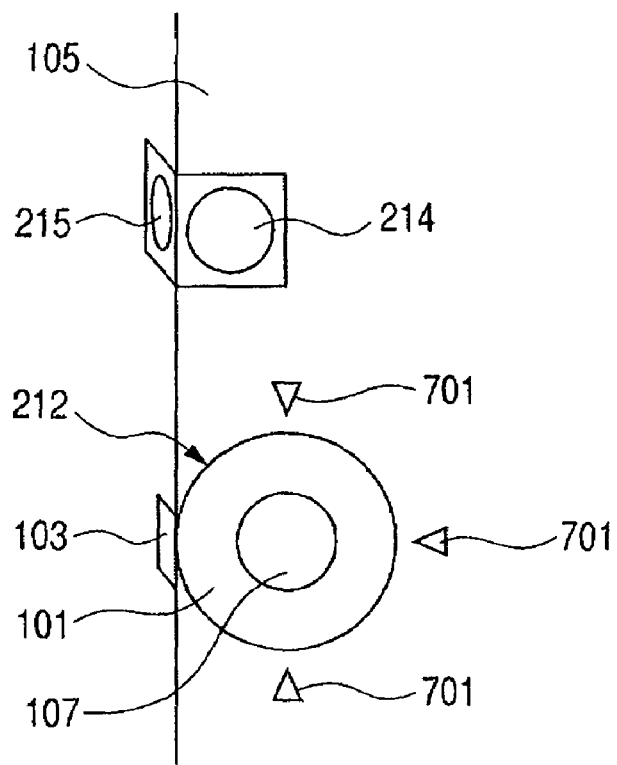
FIG. 7 is an explanatory view of a modification of the multi-function input switch of FIG. 1.

FIG. 7 is an explanatory view of a modification of the multi-function input switch shown in FIG. 1.

In FIG. 7, direction markers 701 indicating the positions of the tactile switches are arranged at the upper, lower, and right sides of the rotary dial 101 on the body frame 105. Each of the direction markers 701 tactually and visually indicates a position to be depressed by the operator when the rotary dial 101 is depressed to close the tactile switch.

Since the direction markers 701 indicating the positions of the tactile switches are arranged at the upper, lower, and right sides of the rotary dial 101 on the body frame 105, the direction markers 701 prevent the operator from losing the sense of direction even when the rotary dial 101 is rotated, and assist an operation in the dark.

Figure 8:
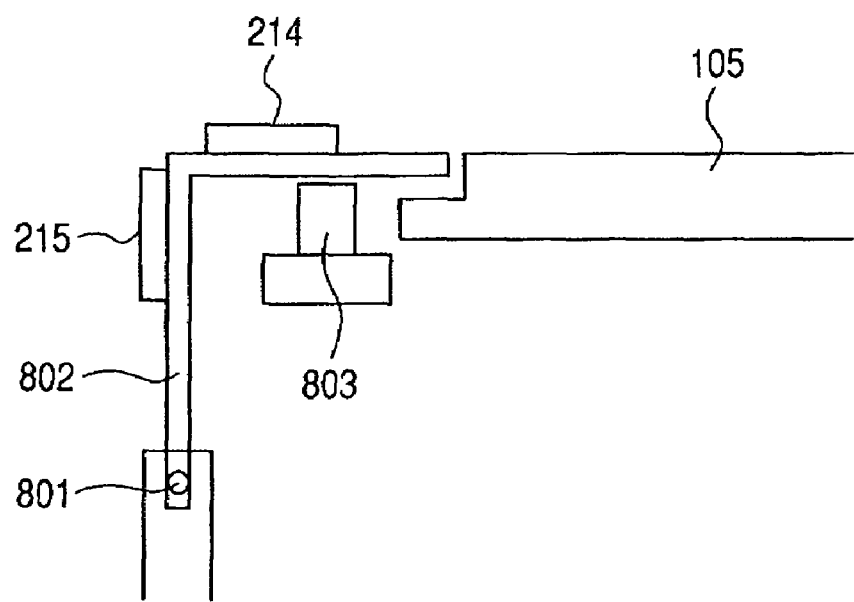
FIG. 8 is a sectional view showing selection buttons shown in FIG. 7.

FIG. 8 is a sectional view showing the selection buttons 214 and 215 shown in FIG. 7.

In FIG. 8, the selection buttons 214 and 215 are provided on a button base 802 having an inverted-L-shaped cross section which is attached to the body frame 105 via a switch hinge 801 so as to freely rotate. A tactile switch 803 is arranged below the selection button 214. The button base 802 is movable in an inward direction, and is held by a spring (not shown) at a position shown in FIG. 8. With this structure, the tactile switch 803 is closed when one of the selection buttons 214 and 215 is depressed, and the tactile switch 803 is opened when the selection buttons 214 and 215 are released.

The selection buttons 214 and 215 shown in FIG. 8 and the multi-function input switch 212 shown in FIG. 2 can be used in combination as a composite input device. In that case, for example, even in a state where the selection button 214 cannot be depressed as shown in FIG. 3, the tactile switch 803 can be closed by pressing the selection button 215. In other words, selection inputs from two directions can be accepted by just the single tactile switch 803, and therefore, cost reduction can be attained while ensuring operation convenience.

Figure 9:
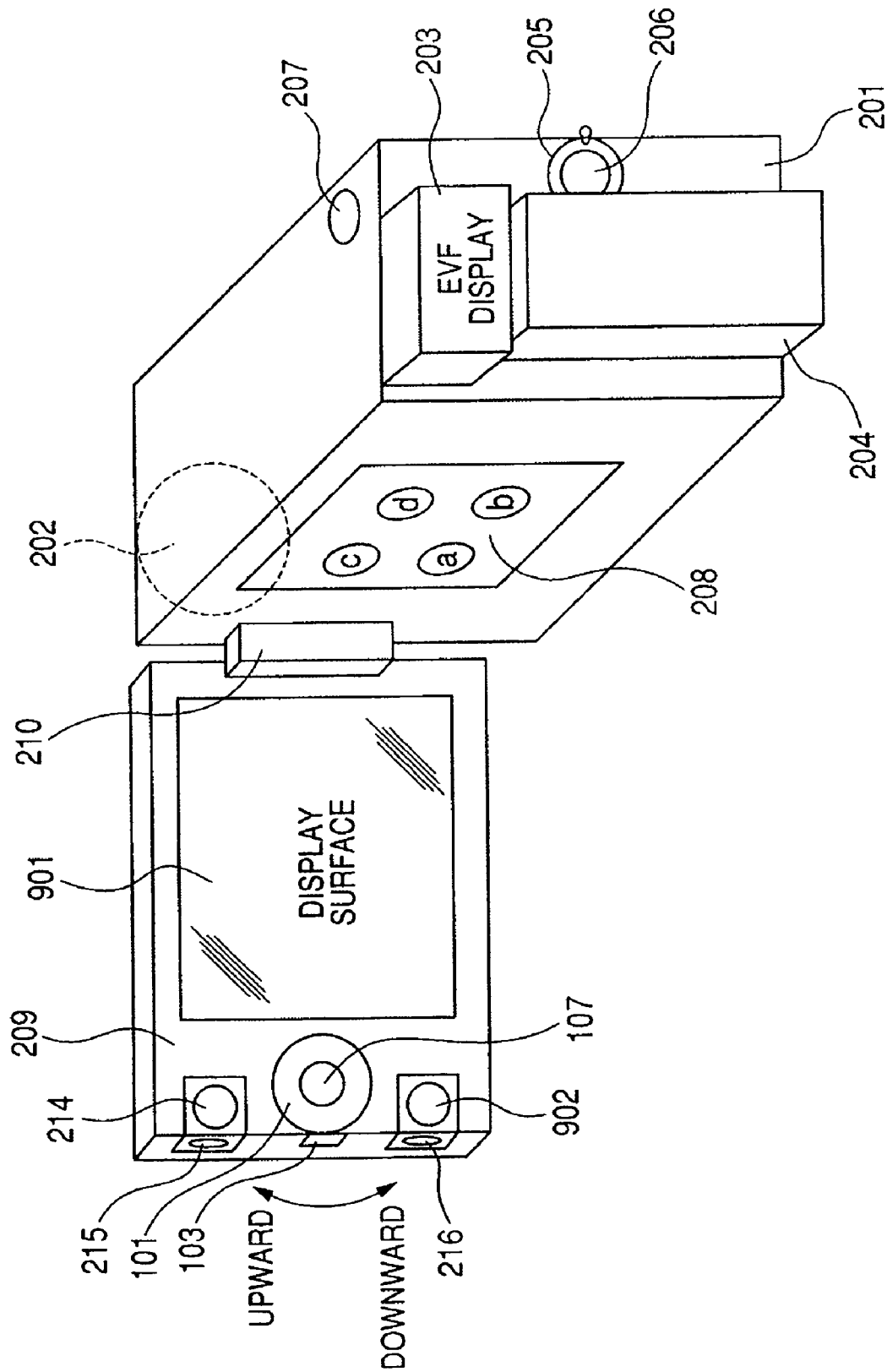
FIG. 9 is a perspective view schematically showing an appearance of a digital video camera having the multi-function input switch of FIG. 1 in a state where the liquid crystal display panel unit is opened and a liquid crystal display surface can be seen from a photographer.
Figure 10:
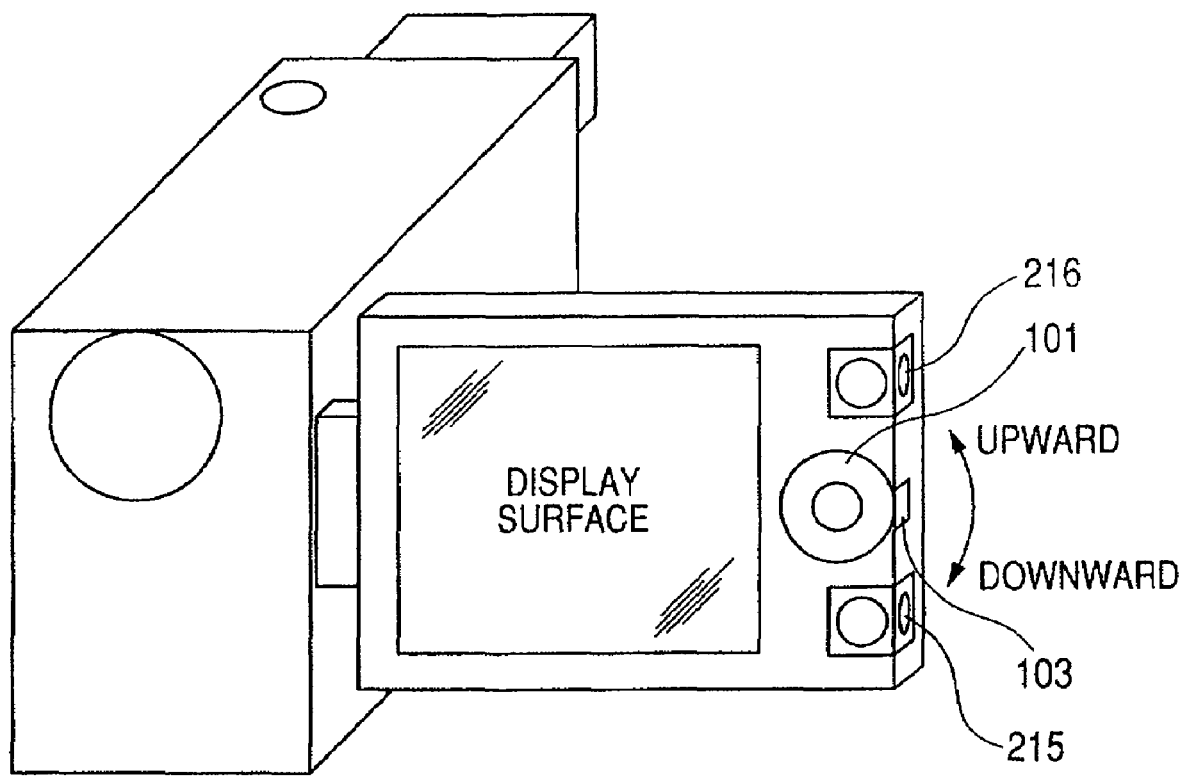
FIG. 10 is a perspective view schematically showing an appearance of the digital video camera of FIG. 9 in a monitor recording state where the liquid crystal display panel unit is opened and the liquid crystal display surface cannot be seen from the photographer (a face-to-face photographing mode)
Figure 11:
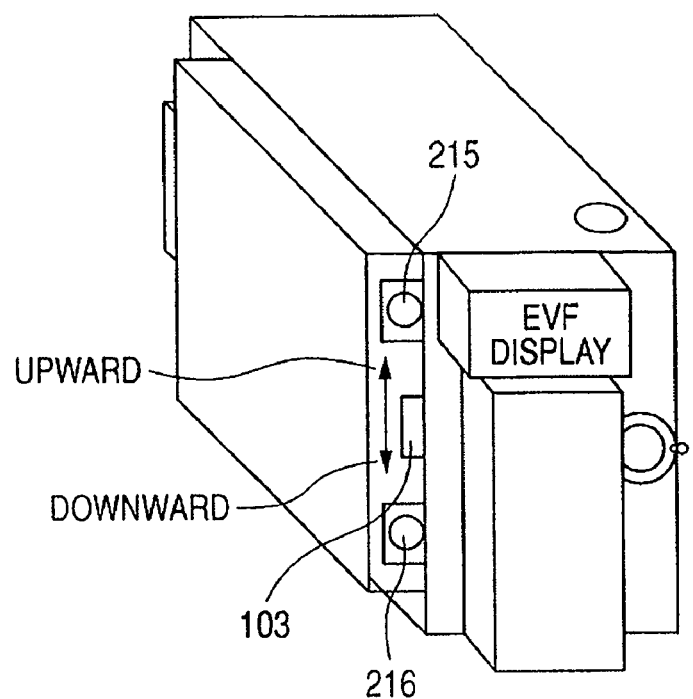
FIG. 11 is a perspective view schematically showing an appearance of the digital video camera of FIG. 9 in a state where the liquid crystal display panel unit is closed toward a main body and the liquid crystal display surface cannot be seen.
Figure 12:
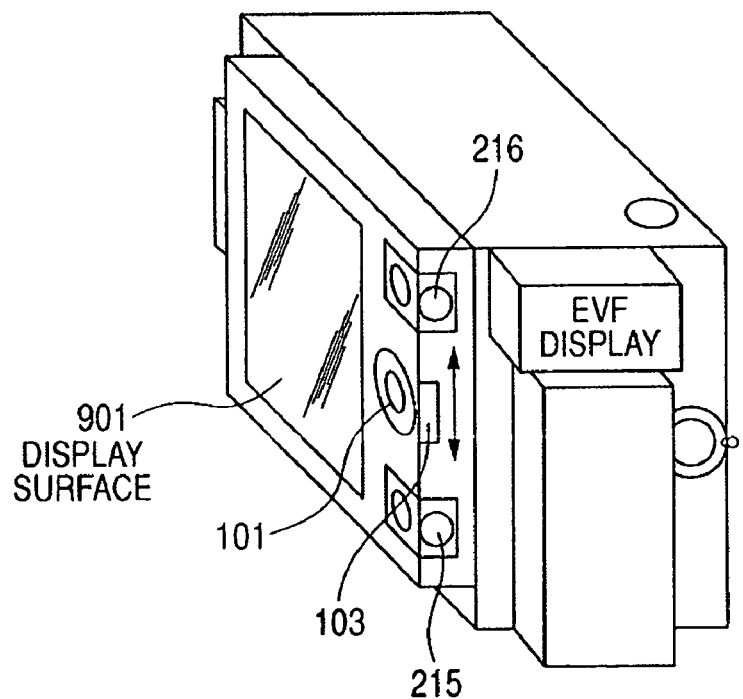
FIG. 12 is a perspective view schematically showing an appearance of the digital video camera of FIG. 9 in a state where the liquid crystal display panel unit is closed toward a main body and the liquid crystal display surface can be seen.

FIGS. 9, 11, and 12 show the digital video camera of FIGS. 2, 3, and 4, respectively, in each of which the selection button 216 is changed so as to have the same structure as a pair of the selection buttons 214 and 215 shown in FIG. 8. FIG. 10 is a view obtained when a display surface 901 of the liquid crystal display panel unit 209 shown in FIG. 9 is rotated to face a photographic object (in the direction of the lens). Those drawings show a state where the directions of the multi-function input switch 212, the selection buttons 214 and 215, and the selection button 216 and a selection button 902 are each vertically and horizontally reversed according to the operation modes of the digital video camera.

FIG. 13 is a diagram showing in detail the operation modes of the digital video camera, and the relationship between each of the operation modes and each of FIGS. 9, 10, 11 and 12.

Defined as a normal state herein is a state where various switches are used for input in the photographing mode or reproduction (including preview) mode while viewing the display surface 901 of the liquid crystal display panel unit 209 shown in FIG. 9. In the normal state, a rotation operation of the rotary dial 101 of the multi-function input switch 212 and a key input operation of the four-way operative input function can be performed, and input operations of the selection buttons 214 and 215 and the selection buttons 216 and 902 respective pairs of which are provided at the upper and lower sides of the multi-function input switch 212, can be performed. On the other hand, inputs of various switches in a state that the liquid crystal display panel unit 209 is rotated and closed toward the main body 201 to allow the display surface 901 to be seen, is defined as an inversion state herein as shown in FIG. 12. In this inversion state, the directions specified by the four-way operative input function of the multi-function input switch 212 are each reversed in each of the vertical and horizontal directions in accordance with the inversion of a display of the display surface 901 in each of the vertical and horizontal directions (a state where the display surface 901 is rotated by 180 degrees). In this case, in addition to the reverse (inversion) of the directions, operations may be prohibited (inputs may be ignored) as needed.

In the state where the liquid crystal display panel unit 209 is closed toward the main body 201 as shown in FIGS. 11 and 12, since the photographer cannot see or cannot easily see the display surface 901 particularly in the photographing (REC)

mode, the EVF 203 serving as a second display portion displays the same content as the display surface 901. In this state, each of the rotary dial of the multi-function input switch and the selection buttons employing the L-shaped mechanism can be operated from a side edge of the display surface even when the other operation functions on the same plane as the display surface cannot be used as shown in FIG. 11. Therefore, an operation can be easily performed while viewing another display portion (herein, EVF display). When the operator operates while viewing the EVF display, as shown in FIG. 12, the rotation direction of the rotary dial and the functions of the selection buttons are reversed so that the operator can operate without confusion, as in the case of FIG. 11.

Figure 14:
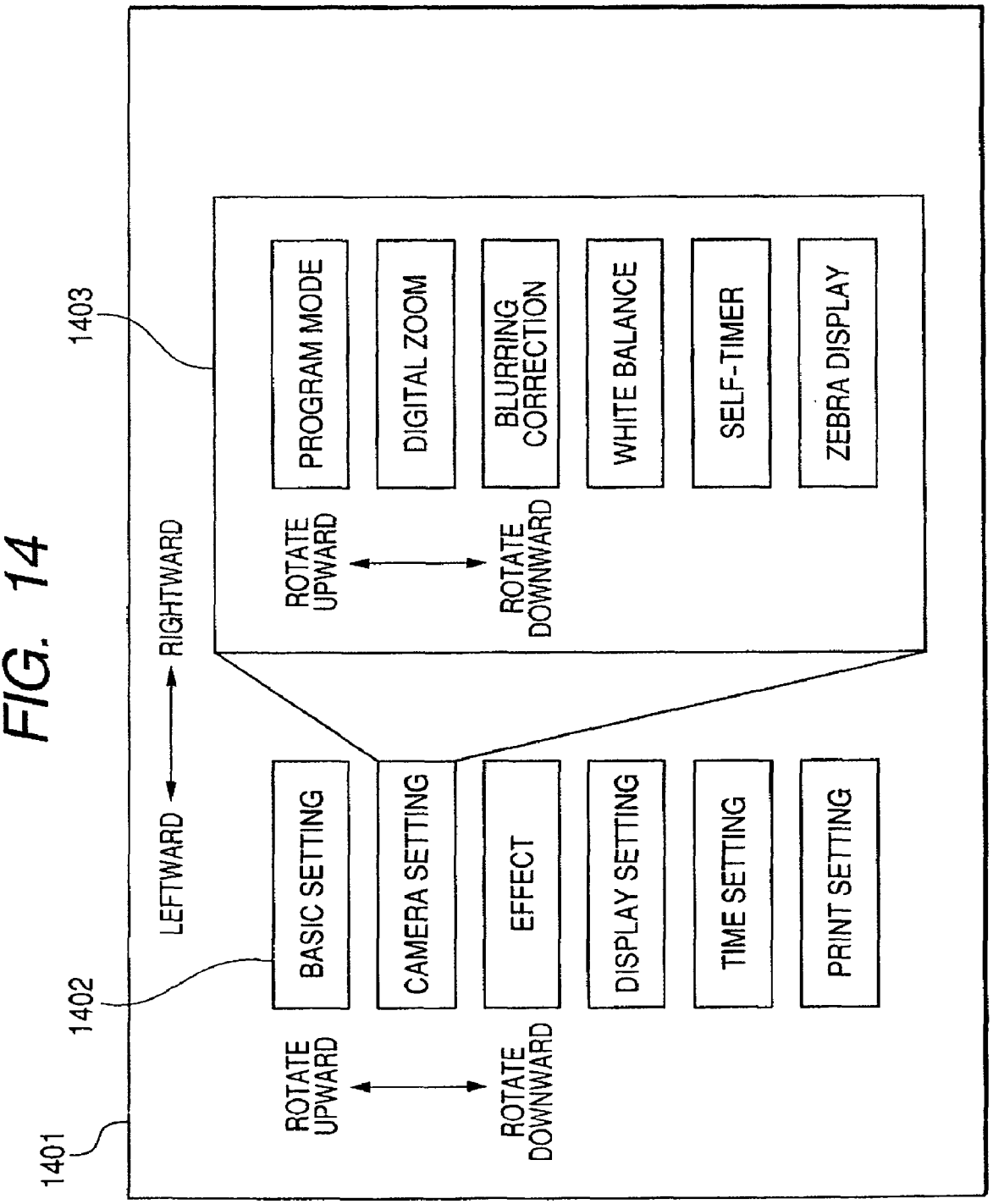
FIG. 14 is a diagram showing a display state of a menu displayed on the liquid crystal display panel unit of the digital video camera of FIG. 9.

FIG. 14 is an image diagram of menus actually displayed on the display surface 901 and the EVF 203, in which a menu list 1402 and a submenu list 1403 are displayed on a display screen 1401. The rotary dial 101 of the multi-function input switch 212 is rotated with the circumferential surface 103 or, if possible, with the ring-shaped plane, thereby moving a selected position in the vertical direction in the menu list 1402. FIG. 14 shows a state in which "camera setting" is tentatively selected. Here, a list belonging to "camera setting" is displayed as a submenu on the right side of "camera setting". In this state, if the selection button 214 or 215 is depressed (alternatively, the center switch 107 is depressed) or a right side of the multi-function input switch 212 is selected through the four-way operative input function, selection control is shifted to the submenu list 1403. Through the rotation operation of the rotary dial 101, a selected position is moved accordingly in the vertical direction in the submenu list 1403. To select/determine an item in the submenu list 1403, the selection button 214 or 215 or the center switch 107 needs to be depressed in the same manner as described above. To return to the previous stage without selection, the selection button 216 or 902 needs to be depressed.

There must be consistency in the operation controls to be performed by the operator. To meet such a demand, in each operation mode, if the display and operation state is changed due to the rotation of the liquid crystal display panel unit and the operation portions, such as the multi-function input switch and the selection buttons, their directions are appropriately reversed vertically and horizontally.

Figure 15:
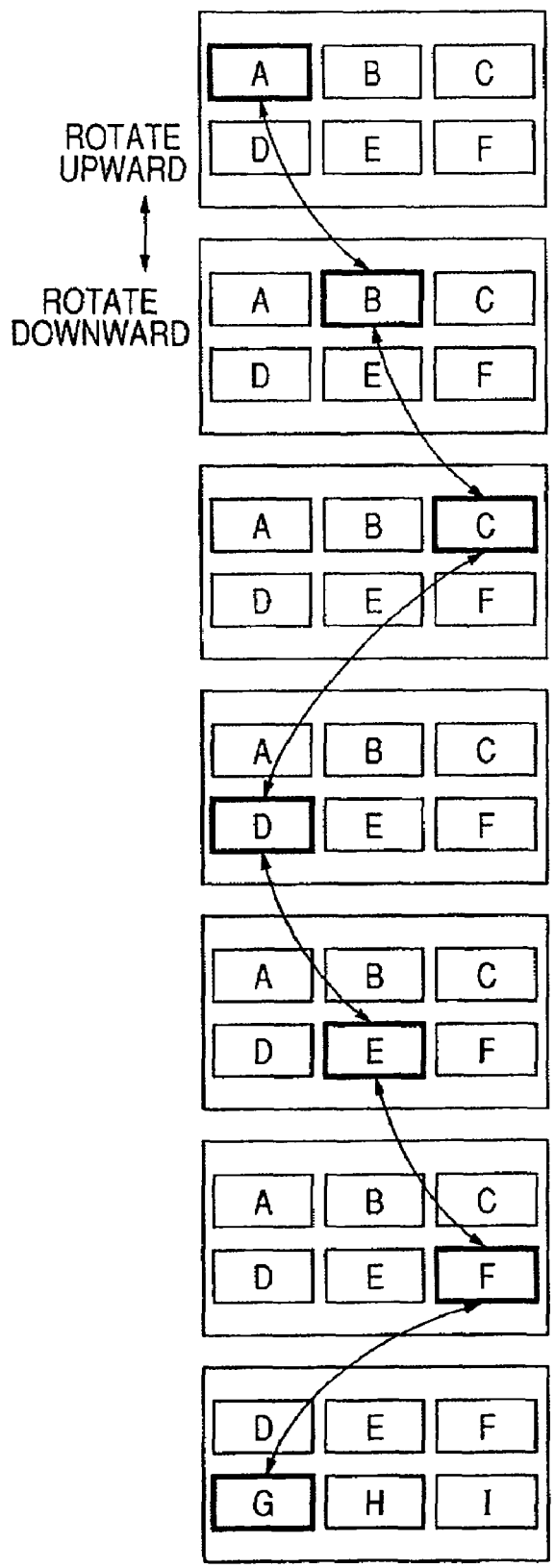
FIG. 15 is an explanatory diagram of an image in which thumbnail displays of photographed still images or chapter displays of scenes obtained by photographing moving images are selected on the liquid crystal display panel unit of the digital video camera of FIG. 9.
Figure 16:
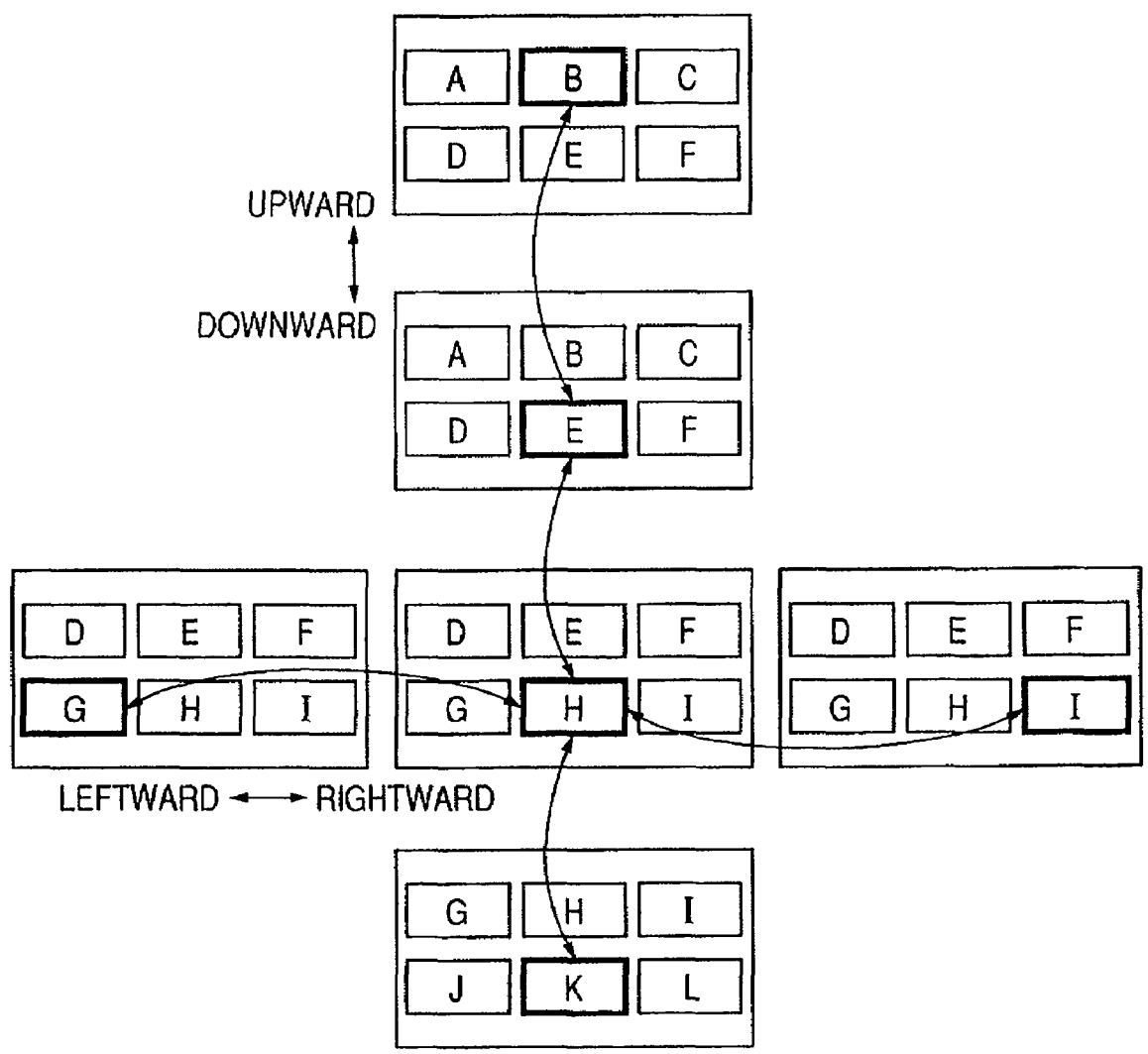
FIG. 16 is an explanatory diagram of an image in which thumbnail displays of photographed still images or chapter displays of scenes obtained by photographing moving images are selected on the liquid crystal display panel unit of the digital video camera of FIG. 9.

FIGS. 15 and 16 are image diagrams showing thumbnail displays of still images photographed in a still image photographing mode which is additionally provided, or chapter displays of scenes obtained by photographing moving images. The rotation operation of the rotary dial 101 of the multi-function input switch 212 enables scroll-selection of display contents in a continuous manner as shown in FIG. 15. In addition, as shown in FIG. 16, when the four-way operative input function is used during the selection, the selection can be performed as desired in the vertical and horizontal directions, and thus the operator can intuitively select thumbnails or chapters.

Figure 17A:
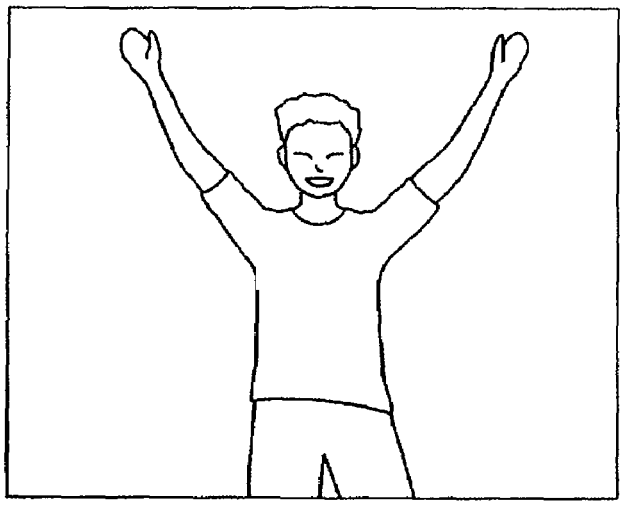
FIGS. 17A, 17B and 17C are explanatory diagrams of a state where a display magnification of a photographed still image or one scene of photographed moving images is changed with the multi-function input switch on the liquid crystal display panel unit of the digital video camera of FIG. 9.
Figure 17B:
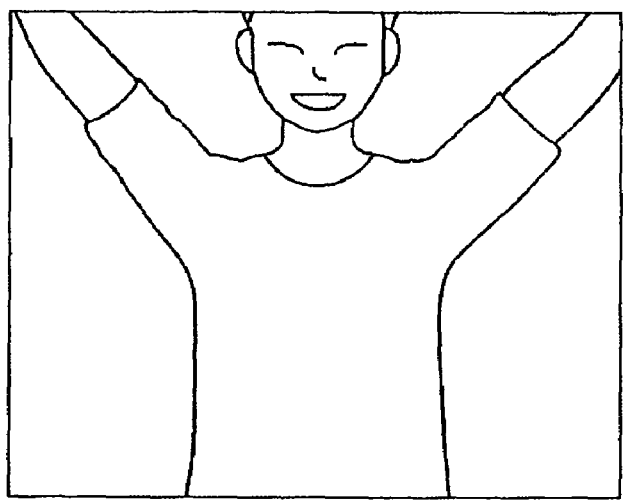
Figure 17C:
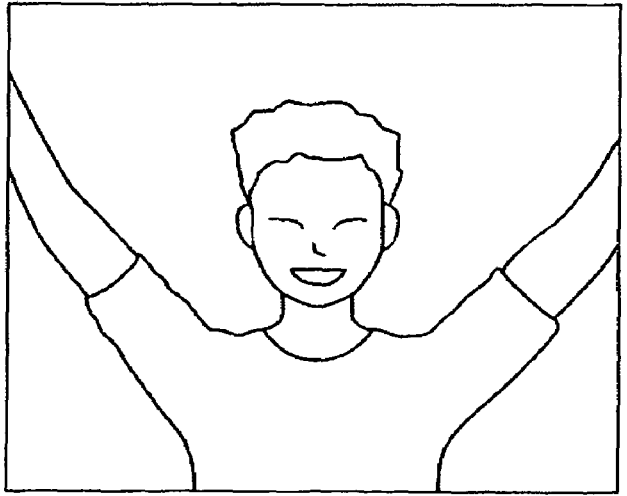

FIGS. 17A, 17B and 17C are diagrams showing a state where a display magnification of a still image photographed in the still image photographing mode, which is additionally provided, or a display magnification of one scene of photographed moving images is changed with the multi-function input switch 212. FIG. 17A is a state of display at the entire angle of view. The rotary dial 101 is rotated to change the display magnification. FIG. 17B shows an example of an enlarged display.

FIG. 17B is the enlarged display with the same center as that of FIG. 17A. FIG. 17C shows an image whose center is changed, in the entire angle of view, by using the four-way operative input function by the operator to display a desired portion. As described above, also in a display magnification operation, the use of the rotary dial 101 and the four-way operative input function makes it possible to change the display magnification and the center position of a display with ease.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures, and functions.

This application claims priority from Japanese Patent Application Nos. 2005-112615 filed on Apr. 8, 2005 and 2006-019170 filed on Jan. 27, 2006, which are hereby incorporated by reference herein.

What is claimed is:

1. A composite input device, comprising:
    a rotary dial;
    a joint portion connected to a side edge portion of a body frame including a display panel; and
    a selection switch arranged on another side edge portion of the body frame,
    wherein the rotary dial is arranged so that each of a circumferential surface portion and a circular plane portion is exposed from the body frame, and
    wherein the selection switch comprises: a sectionally-L-shaped member one end of which is connected to the another side edge portion of the body frame in a movable manner; a tactile switch arranged below the other end of the sectionally-L-shaped member; a first selection depressing portion provided on the one end of the sectionally-L-shaped member; and a second selection depressing portion provided on the other end of the sectionally-L-shaped member.

2. An image capture apparatus, comprising:
    a first display unit attached to a photographing apparatus main body in a movable manner;
    a multi-function input switch having a rotary dial; and
    a selection switch arranged on an open side edge portion of the first display unit,
    wherein the rotary dial is accommodated in a side edge portion of a display surface of the first display unit, and is arranged so that each of a circumferential surface portion and a circular plane portion is exposed from the first display portion and
    wherein the selection switch comprises: a sectionally-L-shaped member one end of which is connected to the open side edge portion of the first display unit in a movable manner; a tactile switch arranged below the other end of the sectionally-L-shaped member; a first selection depressing portion provided on the one end of the sectionally-L-shaped member; and a second selection depressing portion provided on the other end of the sectionally-L-shaped member.

3. An image capture apparatus according to claim 2, further comprising a plurality of tactile switches arranged below the rotary dial in a circumferential direction thereof.

4. An image capture apparatus according to claim 3, further comprising:
    a first detection device for detecting that the first display unit has been inverted about a horizontal axis; and
    a reverse device for reversing a detection result of the tactile switch in a vertical direction if the first display portion is inverted about the horizontal axis.

5. An image capture apparatus according to claim 4, further comprising a determination device for determining whether or not the image capture apparatus is in a reproduction mode, wherein, if the image capture apparatus is in the reproduction mode when the first display unit is inverted about the horizontal axis, the reverse device inverts a display on the first display unit in each of vertical and horizontal directions, and reverses the detection result of the tactile switch in each of the vertical and horizontal directions.

6. An image capture apparatus according to claim 4, further comprising a determination device for determining whether or not the photographing apparatus is in a mirror-image photographing mode, wherein, if the photographing apparatus is in the mirror-image photographing mode when the first display portion is inverted about the horizontal axis, the reverse device inverts a display on the first display unit in a vertical direction, and reverses the detection result of the tactile switch in the vertical direction.

7. An image capture apparatus according to claim 4, further comprising a determination device for determining whether or not the photographing apparatus is in a mirror-image photographing mode, wherein, if the photographing apparatus is not in the mirror-image photographing mode when the first display portion is inverted about the horizontal axis, the reverse device inverts a display on the first display unit in each of vertical and horizontal directions, and reverses a detection result of the tactile switch in each of the vertical and horizontal directions.

8. An image capture apparatus according to claim 2, wherein the selection switch is arranged in a vicinity of the multi-function input switch.

9. An image capture apparatus according to claim 2, wherein the reverse device reverses a detection result of the selection button in a vertical direction on the basis of the reverse of detection results of the plurality of tactile switches arranged in the circumferential direction of the rotary dial.

10. An image capture apparatus according to claim 2, further comprising:

a second detection device for detecting that the first display unit has been rotated about a vertical axis to be closed;

a second display unit provided separately from the first display unit; and a display control device for effecting control so that a display to be displayed on the first display unit is displayed on the second display unit when the second detection device detects that the first display unit has been closed, wherein the display control device displays an arbitrary menu and an icon on the second display unit, and wherein at least one of the multi-function input switch and the selection switch is constructed so as to arbitrarily operate and select the arbitrary menu and the icon displayed on the second display unit.

* * * * *